(No Model.)
T. A. EDISON.
REGULATOR FOR DYNAMO ELECTRIC MACHINES.
No. 264,662. Patented Sept. 19, 1882.
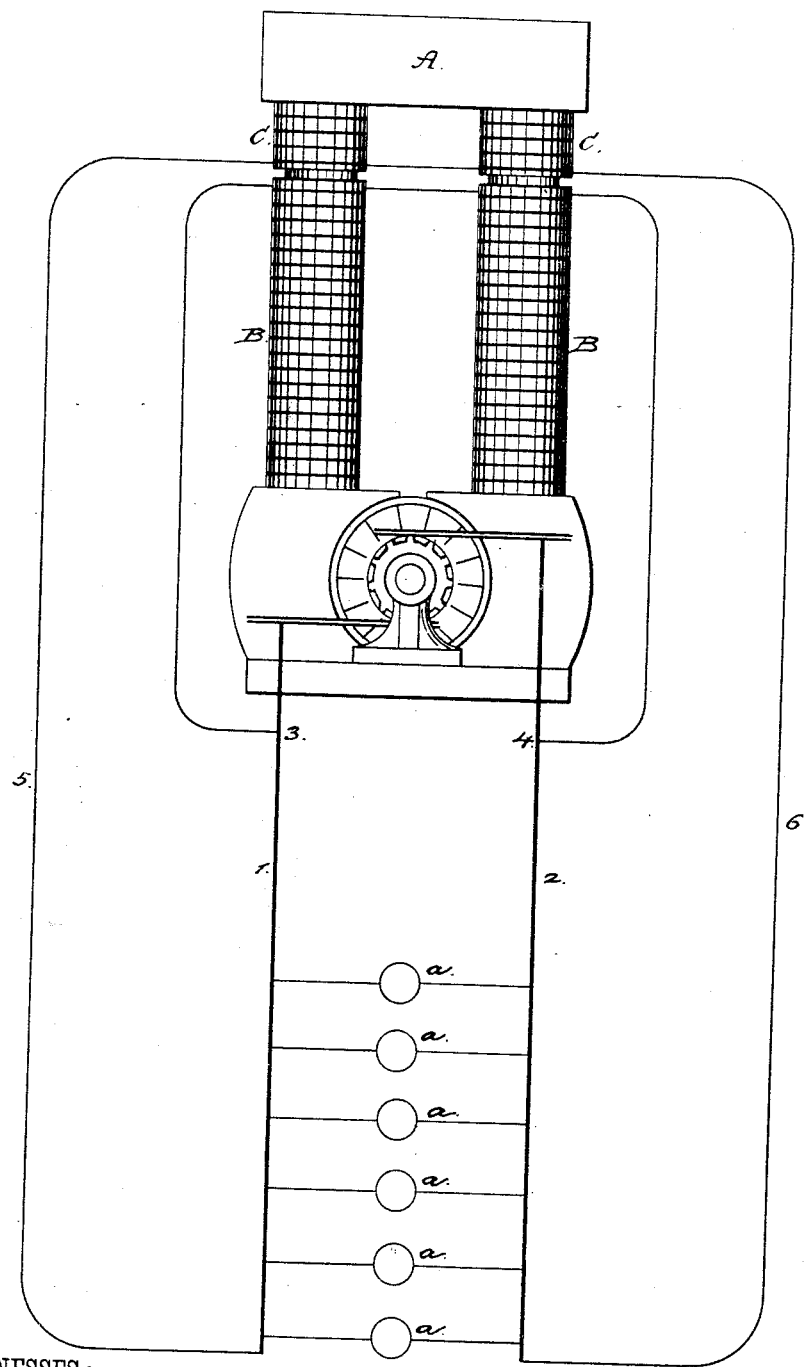
WITNESSES:
E. C. Rowland
F. W. Howard
INVENTOR:
T. A. Edison
BY Rich'd N. Dyer
ATTORNEY.

UNITED STATES PATENT OFFICE.

THOMAS A. EDISON, OF MENLO PARK, NEW JERSEY.

REGULATOR FOR DYNAMO-ELECTRIC MACHINES.

SPECIFICATION forming part of Letters Patent No. 264,662, dated September 19, 1882.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in the Regulation of Dynamo or Magneto Electric Machines, (Case No. 410;) and I do hereby declare that the following is a full and exact description of the same, reference being had to the accompanying drawing, and to the letters of reference marked thereon.

The object of my invention is to produce simple and efficient means for regulating the generation of current by a dynamo or magneto electric machine supplying a multiple-arc system of electrical distribution, according to variations in the number of translating devices in circuit in such system; and my invention consists in winding the field-magnet of the machine in two separate portions, the direction of the winding in one portion being the reverse of that in the other, so that the two parts of the magnet will oppose each other in their attractive energy. The main portion of the wire is included in the field-circuit, which is preferably a multiple-arc circuit from the main conductors of the machine, or which may be supplied from any suitable external source. The oppositely-wound portion is included in another multiple-arc circuit derived from the main conductors. When only a few translating devices are in circuit in the system a large amount of current will pass in this second multiple-arc circuit, which, by opposing the inductive action of the rest of the magnet, allows the generation of only a small amount of current; but as more translating devices are brought into action the current through the reversed coils decreases, and this portion of the magnet becoming less powerful the generation of current increases.

The drawing is a diagram illustrating my invention.

A is the field-magnet of a dynamo-electric machine, each limb of which is wound in two bobbins or sections, B C, the section B being wound in one direction and the section C in the opposite one.

1 2 are the main conductors leading from the machine, and having multiple-arc circuits derived from them, in which are placed lamps or other translating devices, *a a*.

A derived circuit, 3 4, includes the portions B B of the field-magnet coils, and a derived circuit, 5 6, the portions C C, the latter starting from a point beyond the translating devices.

The operation of these circuits is as before explained.

What I claim is—

1. A dynamo or magneto electric machine having a small portion of its field-magnet so wound as to oppose the action of the main portion, in combination with means for varying the current passing in said smaller portion according to the number of translating devices in circuit, whereby the generative capacity of the machine is regulated, substantially as set forth.

2. The combination, with a dynamo or magneto electric machine and translating devices arranged in multiple arc, of a multiple-arc circuit from said machine, including a portion of the coils of its field-magnet, such portion being arranged to have a circuit in a direction opposite to that of the coils included in the primary field-circuit, substantially as and for the purpose set forth.

3. The combination, with a dynamo or magneto electric machine and translating devices arranged in multiple arc, of a multiple-arc circuit including the main portion of its field-magnet coils and another multiple-arc circuit including the remaining portion, these two portions being arranged to have their currents in opposite directions, substantially as and for the purpose set forth.

This specification signed and witnessed this 1st day of May, 1882.

THOMAS A. EDISON.

Witnesses:
H. W. SEELY,
P. B. WILBER.